Patented May 16, 1939

2,158,105

UNITED STATES PATENT OFFICE 2,158,105

CAST IRON WELDING ROD

Charles O. Burgess, Niagara Falls, N. Y., assignor to Oxweld Acetylene Company, a corporation of West Virginia No Drawing. Application May 27, 1937,
Serial No. 145,043

6 Claims. (Cl. 219—8)

The invention relates to welding, referring more specifically to an alloy cast iron welding rod of improved welding characteristics.

By the addition of various alloying elements the strength and toughness of gray cast irons may be improved in a manner well known. If, however, irons improved in this manner are formed into welding rods and thermally deposited as weld metal, it will be found in most instances that the metal so deposited possesses physical properties widely at variance from those of an ordinary casting of the same composition. The thermal conditions of the welding process alter the physical properties of the deposited weld metal, so that an alloy cast iron suitable for ordinary casting conditions is usually totally unsuited for use as a welding rod. Known alloy cast iron welding rods have also had other unsatisfactory characteristics, including insufficient fluidity during welding, incomplete coalescense with the base metal, and a tendency to produce unsound and brittle welds. The strength, both of the deposited weld metal and of the boundary between the deposited metal and the base metal, is usually low. Also, the machined surface of many alloy cast iron welds is different in appearance from that of the base metal.

It is the object of this invention to provide alloy cast iron welding rods which are free from the disadvantages just described. This and other objects are attained in my invention by the application of my discovery that the addition to gray cast iron of the alloying elements, vanadium or chromium, or both, and preferably copper or nickel, or both, in certain specific proportions, produces a material having excellent welding characteristics. More specifically, to a cast iron base metal containing 2.25% to 3.5% silicon, 2.75% to 3.15% carbon, and 0.5% to 1% manganese, I add small amounts of vanadium or chromium or both, preferably with the further addition of small amounts of copper or nickel or both. The preferred proportions of these additions are defined in the table A below, and satisfy the formulae: the sum of the vanadium percentage plus one-half the chromium percentage is between 0.05% and 0.5%; and, if nickel or copper is used, the sum of the copper percentage plus one-half the nickel percentage is between 0.25% and 1.5%. The welds obtained by thermal deposition of rods of the above composition are sound, uniform in hardness, and possess good physical properties, both in the weld metal and at the boundary between the deposited weld metal and the base metal. Further, the machined surface of the welds matches in appearance the machined surface of the base metal.

Compositions which I have found to produce rods of excellent welding characteristics, and with which strong, sound welds of uniform hardness may be obtained, fall within the following limits, the remainder being principally, and preferably all, iron:

Table A

| Percent V+ ½ (percent Cr) | Percent Cu+ ½ (percent Ni) | Percent Si | Percent C | Percent Mn |
|---|---|---|---|---|
| 0.05 to 0.5 | None | 2.25 to 3.5 | 2.75 to 3.15 | 0.5 to 1 |
| 0.05 to 0.5 | 0.25 to 1.5 | 2.25 to 3.5 | 2.75 to 3.15 | 0.5 to 1 |

The preferred maximum amounts of phosphorus and sulphur in the alloys described above are 0.3% and 0.1%, respectively. Part of the silicon may be replaced by copper or nickel or both to yield equivalent softening. Specific limits of vanadium, nickel, and copper are 0.10% to 0.25%, 1% to 2%, and 0.45% to 0.65%, respectively.

When manufacturing metal for the rods of the invention, I prefer to add a part of the silicon, say about 0.25% to 1.5%, while the molten metal is in the ladle, as described in my Patent No. 2,038,639, issued April 28, 1936. The addition of silicon in this manner insures the production of a gray iron, and improves the homogeneity and strength of the welding rods.

Physical properties obtained from comparative tests of welds made with a plain cast iron welding rod (rod 1) and of welds made in accordance with a typical welding rod of this invention (rod 2) appear in Table B. The same base metal and the same welding procedure were used in both tests, and both rods had similar manganese contents.

Table B

| Rod No. | Analysis of rod, remainder iron | | | Pounds per square inch | | Deflection, inch* | Rockwell C hardness number |
|---|---|---|---|---|---|---|---|
| | Percent C | Percent Si | Percent V | Tensile strength | Transverse strength (maximum fiber stress) | | |
| 1 | 3.35 | 2.62 | | 24,500 | 73,000 | 0.11 | 15 to 26 |
| 2 | 3.00 | 3.15 | 0.19 | 43,000 | 87,500 | 0.14 | 23 to 27 |

* Deflection on 7 in. gage length using 0.5 inch square specimen.

It will be observed from the results of these tests that the alloy cast iron weld possesses better physical properties and is more uniform in hardness than the plain cast iron weld.

A comparative radiographic examination of plain cast iron welds, and alloy cast iron welds made in accordance with this invention, revealed that the latter welds were sound and substantially free from blow holes and slag inclusions, whereas the former welds contained numerous defects.

The invention is applicable to both oxyacetylene and arc welding methods.

I claim:

1. A cast iron welding rod containing 2.75% to 3.15% carbon; 2.25% to 3.5% silicon; 0.5% to 1% manganese; at least one metal of the group consisting of vanadium and chromium, the sum of the vanadium percentage and one-half the chromium percentage being between 0.05% and 0.5%; the remainder principally iron.

2. A cast iron welding rod containing 2.75% to 3.15% carbon; 2.25% to 3.5% silicon; 0.05% to 0.5% vanadium; 0.5% to 1% manganese; the remainder iron.

3. A cast iron welding rod containing 2.75% to 3.15% carbon; 2.25% to 3.5% silicon; 0.5% to 1% manganese; 0.05% to 0.5% vanadium; at least one metal of the group consisting of copper and nickel, the sum of the copper percentage and one-half of the nickel percentage being between 0.25% and 1.5%; the remainder iron.

4. A cast iron welding rod containing 2.75% to 3.15% carbon; 2.25% to 3.5% silicon; 0.05% to 0.5% vanadium; 1% to 2% nickel; 0.5% to 1% manganese; the remainder iron.

5. A cast iron welding rod containing 2.75% to 3.15% carbon; 2.25% to 3.5% silicon; 0.10% to 0.25% vanadium; 0.45% to 0.65% copper; 0.5% to 1% manganese; the remainder iron.

6. A welded joint comprising at least two contiguous cast iron members bonded with fusion deposited weld metal containing 2.75% to 3.15% carbon; 2.25% to 3.5% silicon; 0.5% to 1% manganese; at least one metal of the group consisting of vanadium and chromium, the sum of the vanadium percentage and one-half of the chromium percentage being between 0.05% and 0.5%; the remainder principally iron.

CHARLES O. BURGESS.